(12) United States Patent
Barker et al.

(10) Patent No.: US 8,024,291 B2
(45) Date of Patent: *Sep. 20, 2011

(54) MESSAGE GENERATOR

(75) Inventors: David Alexander Barker, Eastleigh (GB); Bharat Veer Bedi, Portsmouth (GB); David C. Conway-Jones, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/349,041

(22) Filed: Jan. 6, 2009

(65) Prior Publication Data

US 2009/0125489 A1    May 14, 2009

Related U.S. Application Data

(63) Continuation of application No. 11/425,214, filed on Jun. 20, 2006, now Pat. No. 7,562,079.

(30) Foreign Application Priority Data

Jun. 24, 2005  (GB) .................................. 0512873.1

(51) Int. Cl.
  *G06F 7/00*   (2006.01)
  *G06F 17/00*  (2006.01)
  *G06F 15/16*  (2006.01)
(52) U.S. Cl. ...................................... 707/628; 709/203
(58) Field of Classification Search ............ 707/999.01, 707/999.002, 999.003, 628; 709/203
See application file for complete search history.

(56) References Cited

U.S. PATENT DOCUMENTS

| 2002/0138582 A1* | 9/2002 | Chandra et al. | 709/206 |
| 2005/0086469 A1* | 4/2005 | Dunagan et al. | 713/163 |

* cited by examiner

*Primary Examiner* — Syling Yen
*Assistant Examiner* — Van H Oberly
(74) *Attorney, Agent, or Firm* — Jon A. Gibbons; Fleit Gibbons Gutman Bongini & Bianco PL

(57) ABSTRACT

A message generator for use in a publish/subscribe system, the publish/subscribe system having a broker for receiving a plurality of messages from one or more publishers and a subscriber: the message generator comprising: a storage component for retaining the plurality of messages; and an aggregator for aggregating the plurality of messages into an aggregated message.

7 Claims, 6 Drawing Sheets

```xml
<?xml version="1.0"?>
<aggregated_content>
    <topic name="Factory">
        <topic name="Building 1">
            <topic name="Location A">
                <topic name="Temperature">
                    <data value="26C"/>
                </topic>
                <topic name="Pressure">
                    <data value="998"/>
                </topic>
            </topic>
        </topic>
    </topic>
</aggregated_content>
```

FIG. 6

MESSAGE GENERATOR

CROSS REFERENCE TO RELATED APPLICATION

The present patent application is a continuation of U.S. patent application Ser. No. 11/425,214 now U.S. Pat. No. 7,562,079, which was filed on Jun. 20, 2006 and commonly assigned herewith to International Business Machines, which is hereby incorporated by reference in its entirety.

FIELD OF THE INVENTION

The present invention relates to a message generator for use in a publish/subscribe system.

BACKGROUND OF THE INVENTION

Publish and Subscribe (pub/sub) is an effective way of disseminating information to multiple users. Pub/Sub applications can help to enormously simplify the task of getting business messages and transactions to a wide, dynamic and potentially large audience in a timely manner.

In a pub/sub system, publishers are typically not concerned with where their messages are going, and subscribers are typically not interested in where the messages they receive have come from. Instead, a message broker typically assures the integrity of the message source and manages the distribution of a message according to subscriptions registered in the message broker. Message topics typically provide the key to the delivery of messages between publishers and subscribers. The message broker attempts to match a topic string on a published message with a list of clients who have subscribed to receive publications including that topic string. In response to a match, the broker sends the published message to the subscriber.

FIG. 1 is a schematic diagram of a conventional data processing system (100), comprising a publisher (105), a broker (110) and a subscriber (125). The broker (110) comprises a match component (115) for matching a topic string on a published message with subscribers that have subscribed to receive publications including that topic string.

In current pub/sub systems, a publisher can request the broker to retain a current message, such that if a new subscriber subscribes to the broker, they can receive the current message from that publisher. The current message is retained in a storage component (120). In an example, if a publisher publishes a message and requests a broker to retain the published message, a subscriber who subsequently subscribes to a topic associated with the published message receives the published message immediately from the broker. This means that new subscribers do not have to wait for data to be published again before they receive it. The broker retains only one publication for each topic, so the previous publication is deleted when a new one arrives.

A disadvantage in current pub/sub systems is that a subscriber subscribing to a plurality of topics receives messages from the broker in a piecemeal fashion, that is, a subscriber receives a message whenever a message associated with a topic that they have subscribed to is published. It can be difficult for a subscriber to make sense of the messages that they receive, for example, if they have subscribed to several topics.

DISCLOSURE OF THE INVENTION

According to a first aspect, the present invention provides a message generator for use in a publish/subscribe system, the publish/subscribe system having a broker for receiving a plurality of messages from one or more publishers and a subscriber: the message generator comprising: a retain component for retaining the plurality of messages; and an aggregator for aggregating the plurality of messages into an aggregated message.

Preferably, the plurality of messages is retained in a storage component. More preferably, the subscriber subscribes to a plurality of topics associated with the plurality of messages. Still more preferably, said plurality of messages comprises a portion of a topic tree.

In a preferred embodiment, the message generator further comprises a search component for searching the storage component for the plurality of messages. Preferably, there is provided a rule generator for generating one or more rules for aggregating the plurality of messages. More preferably, the one or more rules comprise one or more user preferences.

Preferably, the broker sends the aggregated message to the subscriber. More preferably, the retain component retains one message for each topic.

According to a second aspect, the present invention provides a method for generating a message for use in a publish/subscribe system, the publish/subscribe system having a broker for receiving a plurality of messages from one or more publishers and a subscriber: the method comprising the steps of: retaining the plurality of messages; and aggregating the plurality of messages into an aggregated message.

According to a third aspect, the present invention provides a computer program comprising program code means adapted to perform all the steps the method described above, when said program is run on a computer.

BRIEF DESCRIPTION OF THE DRAWINGS

The present invention will now be described, by way of example only, with reference to preferred embodiments thereof, as illustrated in the following drawings:

FIG. 6 is a representation of an aggregated message.

DETAILED DESCRIPTION OF THE PREFERRED EMBODIMENT

Figure 1:
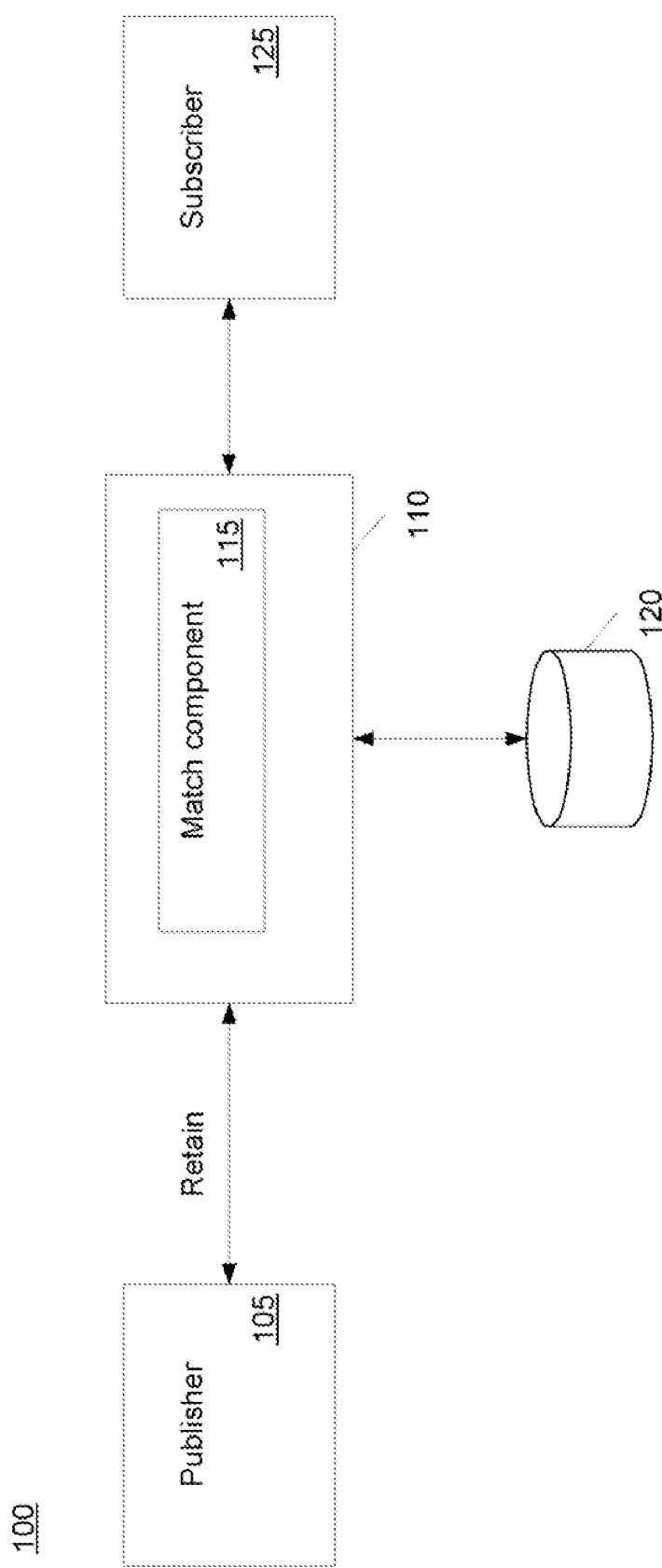
FIG. 1 is a prior art data processing system.
Figure 2:
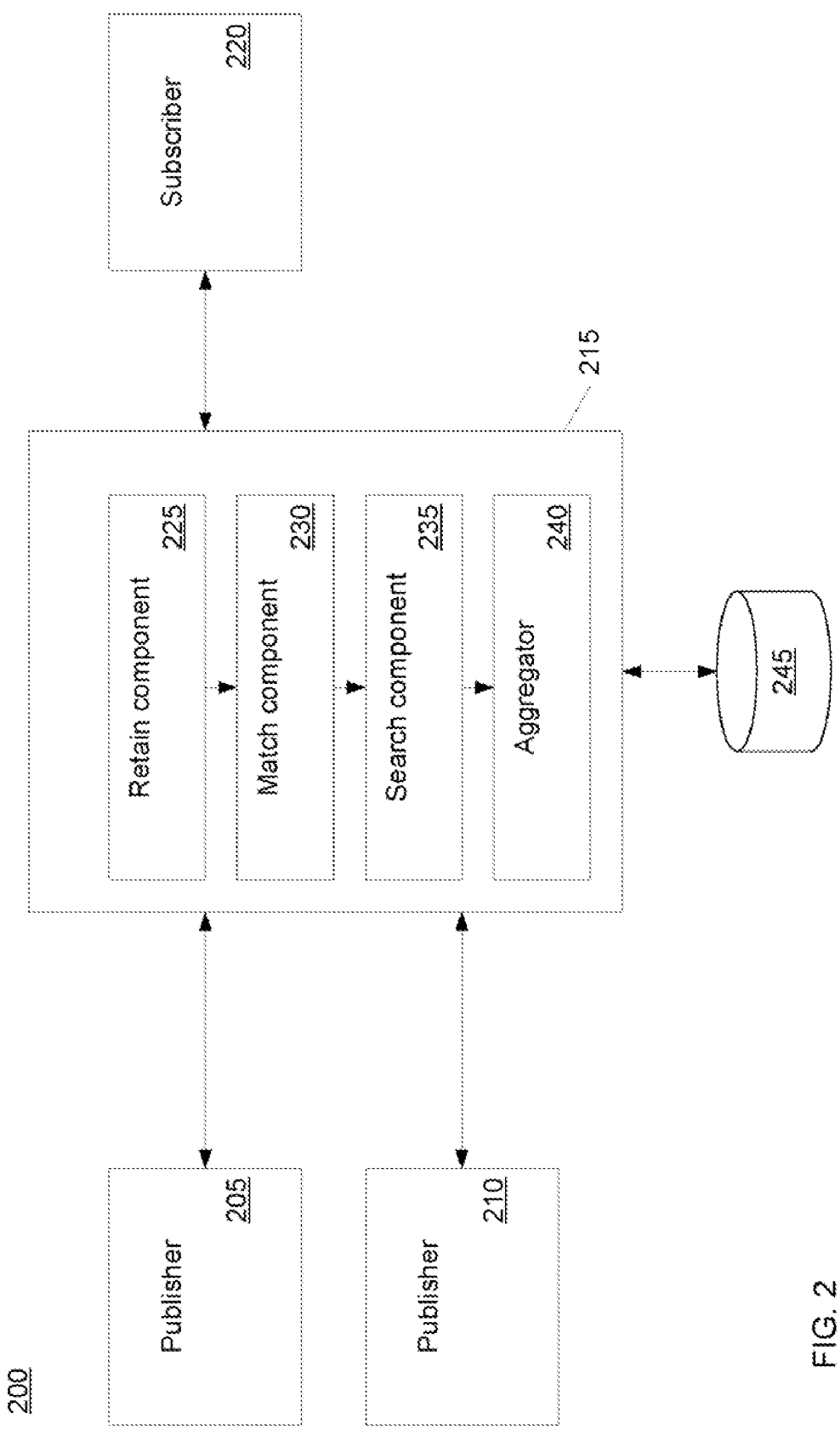
FIG. 2 is a schematic diagram of a data processing system in which the present invention may be implemented.
Figure 3:
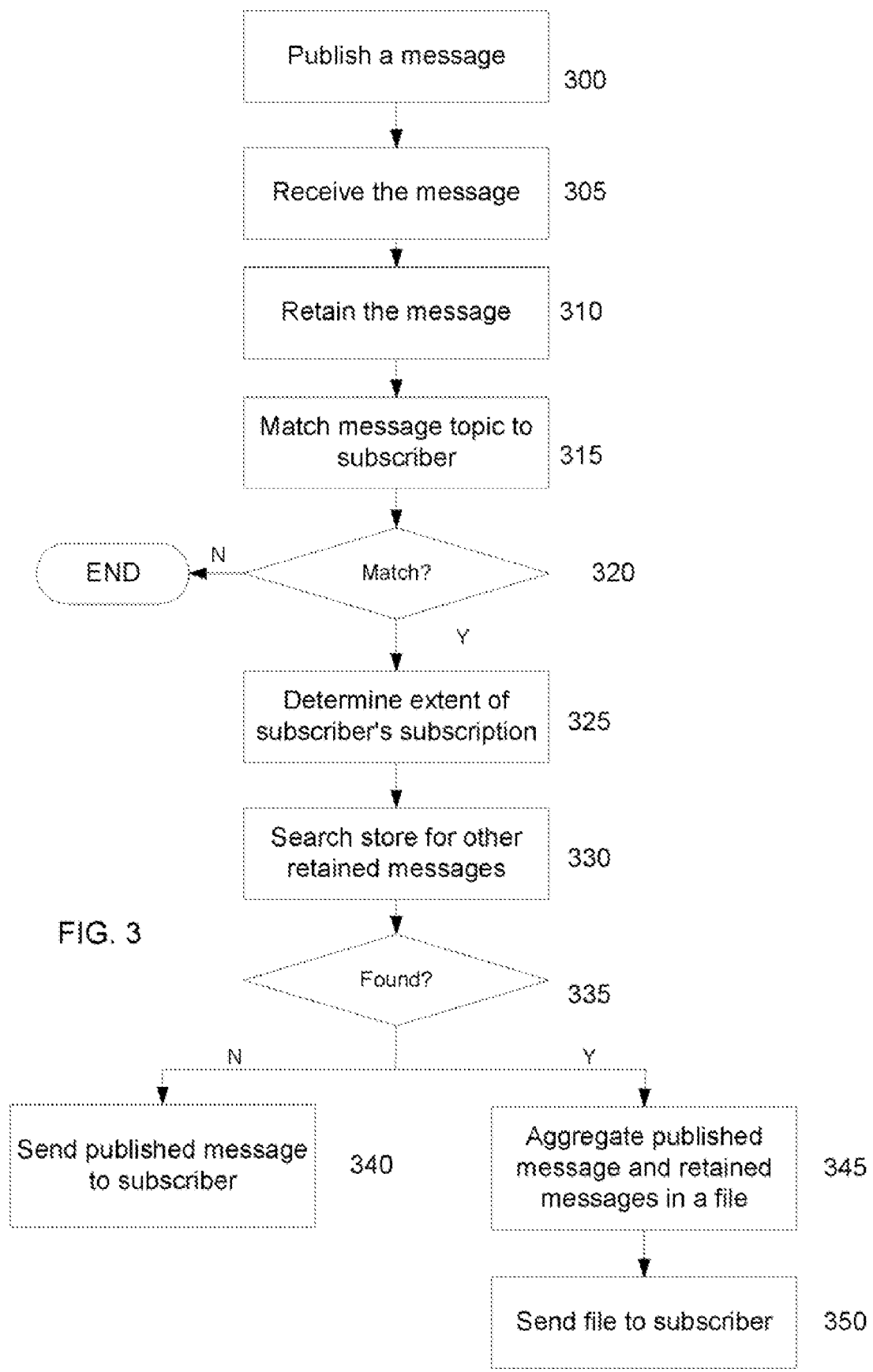
FIG. 3 is a flow chart showing the operational steps involved in a process according to a preferred embodiment of the present invention.

FIG. 2 is a schematic diagram of a data processing system (200) in which a preferred embodiment of the present invention may be implemented. There is shown one or more publishers (205, 210), a broker (215) and a subscriber (220). The broker (215) comprises a plurality of components: a retain component (225), a match component (230), a search component (235) and an aggregator (240). The broker (215) also comprises a storage component (245).

Preferably, the broker (110) conceptually maintains a hierarchical structure of topics into which the publisher (105) can publish messages, and the subscriber (125) can subscribe to explicit topics and sub-trees of the hierarchy. This hierarchical structure of topics is in the form of a tree structure (known as a topic tree) comprising nodes and leaf nodes, where each node of the structure corresponds to a particular topic into which data messages can be published. This tree structure also contains a list of subscribers for each topic. It should be understood that a subscription to a given topic (or sub-topic) typically also results in a subscription to sub-topics associated with that topic (or sub-topic).

A preferred embodiment of the present invention will now be described with reference to FIGS. 2-5. Firstly, a publisher (205) publishes (step 300) a first message at the broker (215). In a first example, the publisher (205) publishes the first message against a topic Factory/Building 1/Location A/Temperature.

Figure 4:
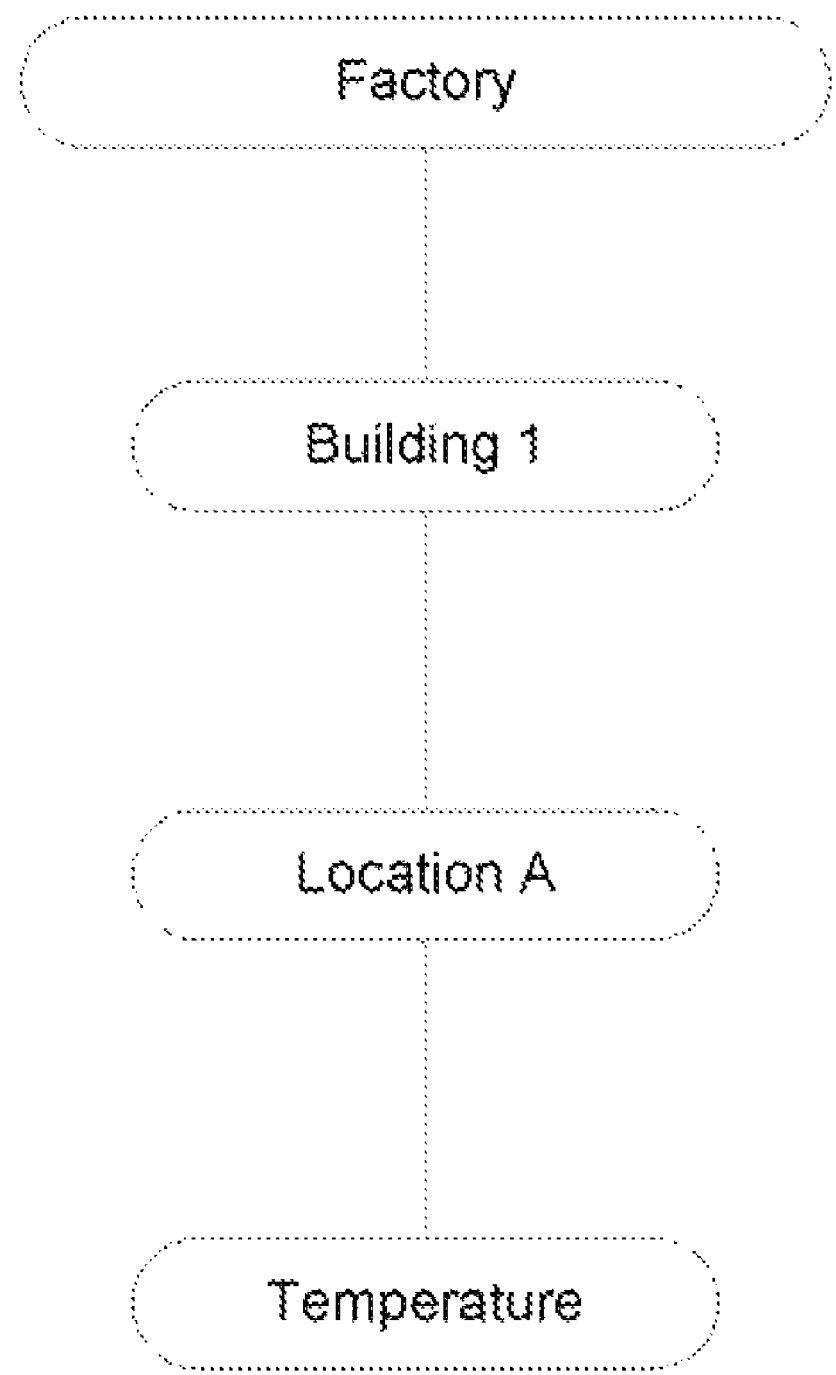
FIG. 4 is a representation of a topic tree held at a broker.

FIG. 4 is a representation of a topic tree associated with the topic. A root topic, namely "Factory", comprises a sub-topic, namely "Building 1". The "Building 1" sub-topic further comprises a sub-topic, namely "Location A". The "Location A" sub-topic further comprises a sub-topic, namely, "Temperature".

A representation of the first message is shown below:

```
<msg>
    <header>
        <topic>Factory/Building 1/Location A/Temperature</topic>
    </header>
    <body>
        <data>26C</data>
    </body>
</msg>
```

Next, in response to the broker (215) receiving (step 305) the first message, the retain component (225) retains (step 310) the first message in the storage component (245). Preferably, for each topic, only one message is retained.

Note that the retain component (225) forces the broker (215) to retain a message, unlike a conventional pub/sub system in which a message is retained only in response to a publisher's request.

In the first example, the storage component (245) is a relational database and a record associated with the first message comprises one or more fields. In the first example, the fields are "Topic" (wherein an element of the record associated with the "Topic" field represents a topic name) and "Data" (wherein an element of the record associated with the "Data" field represents data from a message). The retain component (225) extracts data from the first message, wherein the topic name is contained within a pair of tags "<topic> </topic>" in the header of the message and the message data is contained within a pair of tags "<data> </data>" in the body of the message.

A representation of the record is shown in Table 1 below:

TABLE 1

| Topic | Data |
|---|---|
| Factory\Building 1\Location A\Temperature | 26C |

Next, the match component (230) undertakes a typical "section-by-section" match (step 315) of the topic in the first message against the tree structure. That is, the match component (230) searches down the tree structure for those parts of the topic delimited by "/", until a node is reached which contains a list of all subscribers who have subscribed to receive that particular publication. The broker (215) uses this subscriber information to send the message to the appropriate subscribers.

Next, the match component (230) makes a determination (step 320) as to whether a match has been found. In response to an unsuccessful match (that is, a negative outcome to step 320), the process ends.

In the first example, the subscriber (220) is found in the subscriber list by the match component (230). In response to a successful match (that is, a positive outcome to step 320), the match component (230) determines (step 325) a level in the topic tree at which the subscriber (220) has subscribed.

In the first example, the subscriber (220) subscribes to the "Building 1" sub-topic, which means that the subscriber (220) will receive any messages that are published to the sub-topic "Factory/Building 1/Location A/Temperature". Preferably, the subscriber uses a character recognised by the broker (215) in order to subscribe—for example, Factory/Building/* (wherein "*" is the recognised character).

Next, the search component (235) searches (step 330) the storage component (245) for one or more retained messages associated with the subscriber's subscriptions. Next, the search component (235) determines (step 335) whether one or more other retained messages (i.e. in addition to the published message) have been found. In the first example, with reference to Table 1, one or more other retained messages are not found by the search component (235), that is, only the published first message is found. Thus, in response to a negative outcome to step 335, the first message is sent (step 340) to the subscriber (220) by the broker (215).

Next, a publisher (210) publishes (step 300) a second message at the broker (215). In the first example, the publisher (210) publishes the second message against a topic Factory/Building 1/Location A/Pressure.

Figure 5:
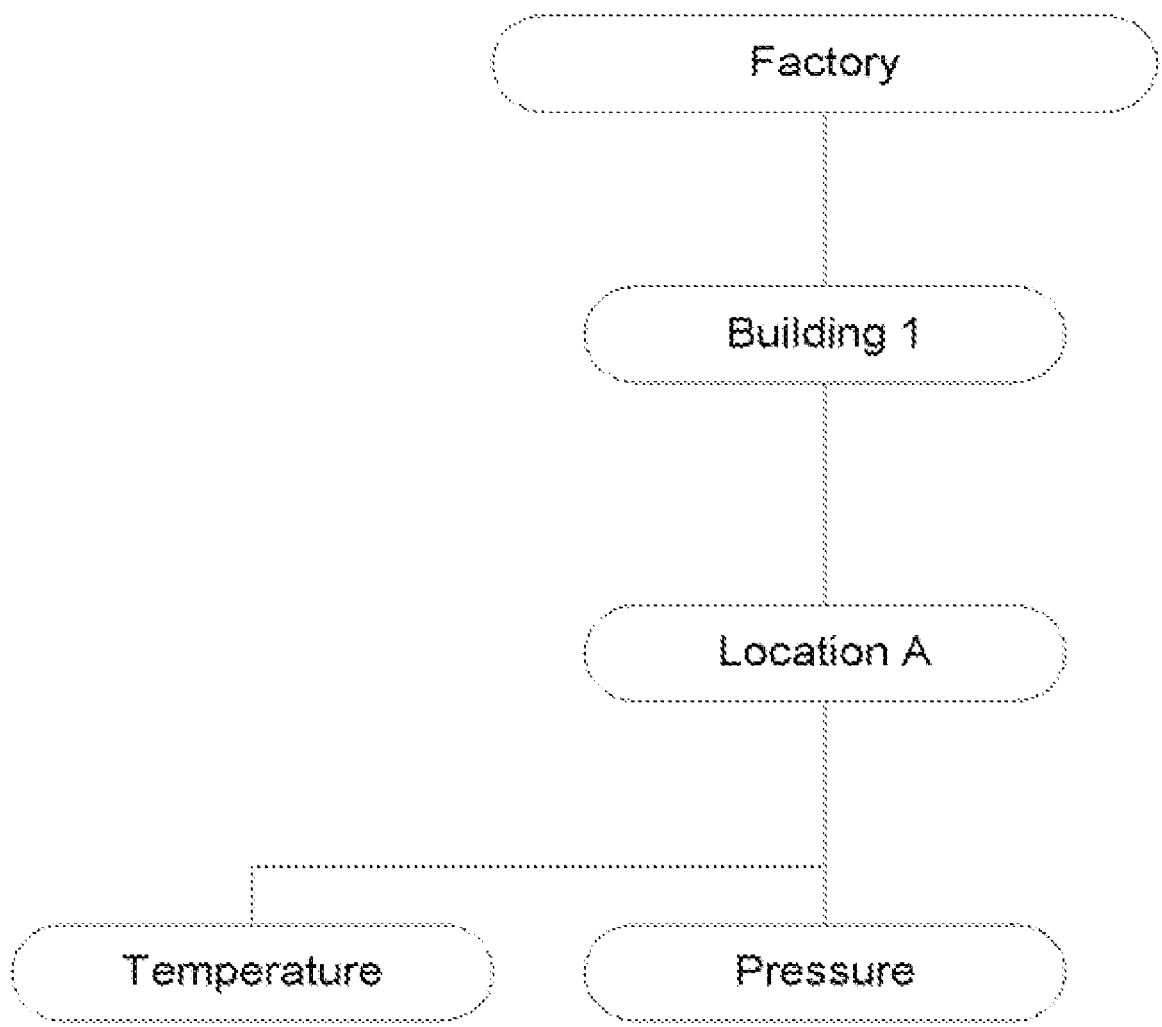
FIG. 5 is an updated representation of the topic tree of FIG. 4.

FIG. 5 is a representation of a topic tree associated with the topic. A root topic, namely "Factory", comprises a sub-topic, namely "Building 1". The "Building 1" sub-topic further comprises a sub-topic, namely "Location A". The "Location A" sub-topic further comprises a sub-topic, namely, "Pressure".

A representation of the second message is shown below:

```
<msg>
    <header>
        <topic>Factory/Building 1/Location A/Pressure</topic>
    </header>
    <body>
        <data>998</data>
    </body>
</msg>
```

Next, in response to receiving (step 305) the second message, the retain component (225) retains (step 310) the second message in the storage component (245) as before. A representation of the record is shown in Table 2 below:

TABLE 2

| Topic | Data |
|---|---|
| Factory\Building 1\Location A\Temperature | 26C |
| Factory\Building 1\Location A\Pressure | 998 |

Next, the match component (230) undertakes a typical "section-by-section" match (step 315) of the topic in the second message against the tree structure. That is, the match component (230) searches down the tree structure for those parts of the topic delimited by "/", until a node is reached which contains a list of all subscribers who have subscribed to receive that particular publication. The broker (215) uses this subscriber information to send the message to the appropriate subscribers.

Next, the match component (230) makes a determination (step 320) as to whether a match has been found. In response to an unsuccessful match (that is, a negative outcome to step 320), the process ends.

In the first example, since the subscriber (220) subscribes to the "Building 1" sub-topic, by default, they also subscribe to any sub-topics associated with the "Building 1" sub-topic. Thus, the subscriber (220) is found in the subscriber list by the match component (230). In response to a successful match (that is, a positive outcome to step 320), the match component (230) determines (step 325) a level in the topic tree at which the subscriber (220) has subscribed.

In the first example, the subscriber (220) subscribes to the "Building 1" sub-topic.

Next, the search component (235) searches (step 330) the storage component (245) for one or more other retained messages associated with the subscriber's subscription. Next, the search component (235) determines (step 335) whether one or more other retained messages have been found.

In the first example, with reference to Table 2, the search component (235) finds another retained message, wherein the another retained message is the published first message associated with the topic Factory\Building 1\Location A\Temperature.

Thus, in response to a positive outcome to step 335, the aggregator (240) is invoked. The aggregator (240) aggregates (step 345) the published second message and the retained first message in an aggregated message.

In the first example, the aggregator (240) comprises a read function for reading data from the storage component (245) and a write function for outputting data from the storage component (245).

Preferably, the write function is executed in accordance with one or more rules. In the first example, the write function is executed in accordance with a plurality of rules. A first rule creates a tag associated with data from an element associated with the "Topic" field (termed herein a "Topic" tag) and a tag associated with data from an element associated with the "Data" field (termed herein a "Data" tag). A second rule assigns parameters to the tags, derived from data in the elements—that is, a "name" attribute is assigned to data from an element associated with the "Topic" field and a "value" attribute is assigned to data from an element associated with the "Data" field. A third rule creates a "Topic tag" for one or more sub-sets of the data from an element associated with the "Topic" field—specifically, for each sub-set preceding a delimiter. A fourth rule eliminates common sub-sets of data from elements in the "Topic" field. A fifth rule applies nesting to the tags such that "Topic" tags are nested according to the hierarchy of the topic structure and one or more "Data" tag are nested within a corresponding "Topic" tag.

In the first example, the aggregator (240) processes content in the storage component (245) to produce a message comprising hierarchical output (for example an XML document).

In the first example, with reference to Table 2, the read function reads the first element in the "Topic" field. The write function outputs a plurality of "Topic" tags for each sub-set of the data in the first record preceding a delimiter (according to the first and third rules) and assigns a "name" attribute to each sub-set of data (according to the second rule). The "Topic" tags are then nested hierarchically (according to the fifth rule).

Next, the read function reads the first element from the "Data" field. The write function outputs a "Data tag" and assigns a "value" attribute to the data (according to the first and second rules). The "Data" tag is then nested within the hierarchy created (according to the fifth rule).

Next, the read function reads the second record in the "Topic" field. The write function outputs a "Topic" tag for a sub-set of the data in the second record (i.e. eliminating common sub-sets of data) (according to the fourth rule) and assigns a "name" attribute to the sub-set of data. The "Topic" tag is then nested within the hierarchy created.

Next, the read function reads the second record from the "Data" field. The write function outputs a "Data tag" and assigns a "value" attribute to the data. The "Data" tag is then nested within the hierarchy created.

An example of the resulting message, represented as an XML document, is shown in FIG. 6. Note that the XML document comprises start and end tags (< > and </>), enclosing tags (<aggregated content> and </aggregated content>) and delimiters denoting leaf nodes (e.g. "26C"/), in order to comply with the XML format.

Next, the broker (215) sends (step 350) the message to the subscriber.

It should be understood that if a new, second subscriber (not shown) now subscribes to the Building 1 sub-topic, the broker (215) sends the message (e.g. shown in FIG. 6) to the new, second subscriber, such that they receive a message representing the entire portion of the topic tree that they have subscribed to and any message that has been published to topics in that topic tree.

Preferably, the message is created in accordance with a subscriber's preferences (e.g. format, language etc.), wherein the subscriber can register their preferences at the broker. Thus, advantageously, the message can be consumed easily by the subscriber.

It should be understood that any part of the topic tree that a subscriber has subscribed to can be represented in the message (e.g., the entire topic tree, one or more branches of the topic tree etc.). It should be understood that the message can also comprise other data e.g. data regarding Quality of Service of a message.

An advantage of the present invention is to provide a subscriber with data associated with an entire portion of a topic tree that they have subscribed to, without any configurations required to a publisher or to a subscriber, whenever a message is published to a topic in the portion of the topic tree.

The invention claimed is:

1. A message generator for use in a publish/subscribe system, the message generator comprising:
a storage component adapted to retain the plurality of messages;
a hierarchical structure within the storage component comprising a plurality of levels and sublevels, wherein each level corresponds to an information topic and each sublevel corresponds to an information subtopic;
a message broker adapted to:
retain a plurality of messages received from at least one publisher of messages in the hierarchical structure based on information topic identifiers in each of the messages;
receive at least one additional message from at least one publisher of messages;
identifying a pair topic tags within at least one message in the plurality of messages;
extract an information topic identifier between the pair of topic tags;
identify a level in the hierarchical structure that corresponds to an information topic that substantially matches the information topic identifier that has been extracted;
obtain subscriber information from a sublevel of the level that has been identified;

aggregate the at least one additional message with at least one message that has been retained to create an aggregated message, wherein the at least one message that has been retained is associated with an information subtopic of at least a sublevel of the level that has been identified; and send the aggregated message to at least on subscriber based on the subscriber information that has been obtained.

2. A message generator as claimed in claim 1 further including a search component for automatically searching the storage component without user intervention for the at least one message that has been retained in response to receiving the at least one additional message.

3. A message generator as claimed in claim 2 further including a rule generator for generating one or more rules for aggregating at least one additional message with the at least one message that has been retained, the one or more rules comprising one or more user preferences.

4. A message generator as claimed in claim 1, wherein the subscriber subscribes to a plurality of topics associated with the plurality of messages and the plurality of messages comprises a portion of a topic tree.

5. A message generator as claimed in claim 4, wherein the storage component retains one message for each topic.

6. A message generator as claimed in claim 2, wherein the subscriber subscribes to a plurality of topics associated with the plurality of messages and the plurality of messages comprises a portion of a topic tree.

7. A message generator as claimed in claim 6, wherein the storage component retains one message for each topic.

* * * * *